Patented Oct. 31, 1939

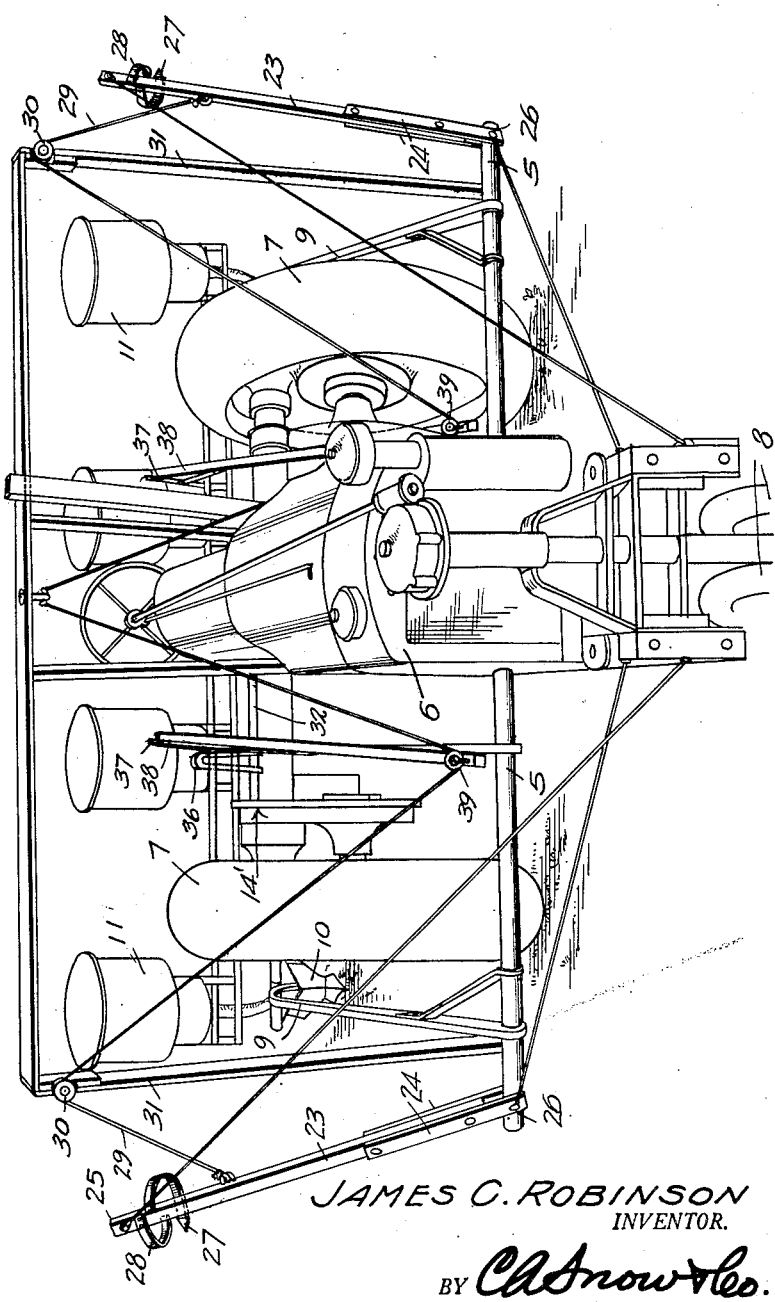

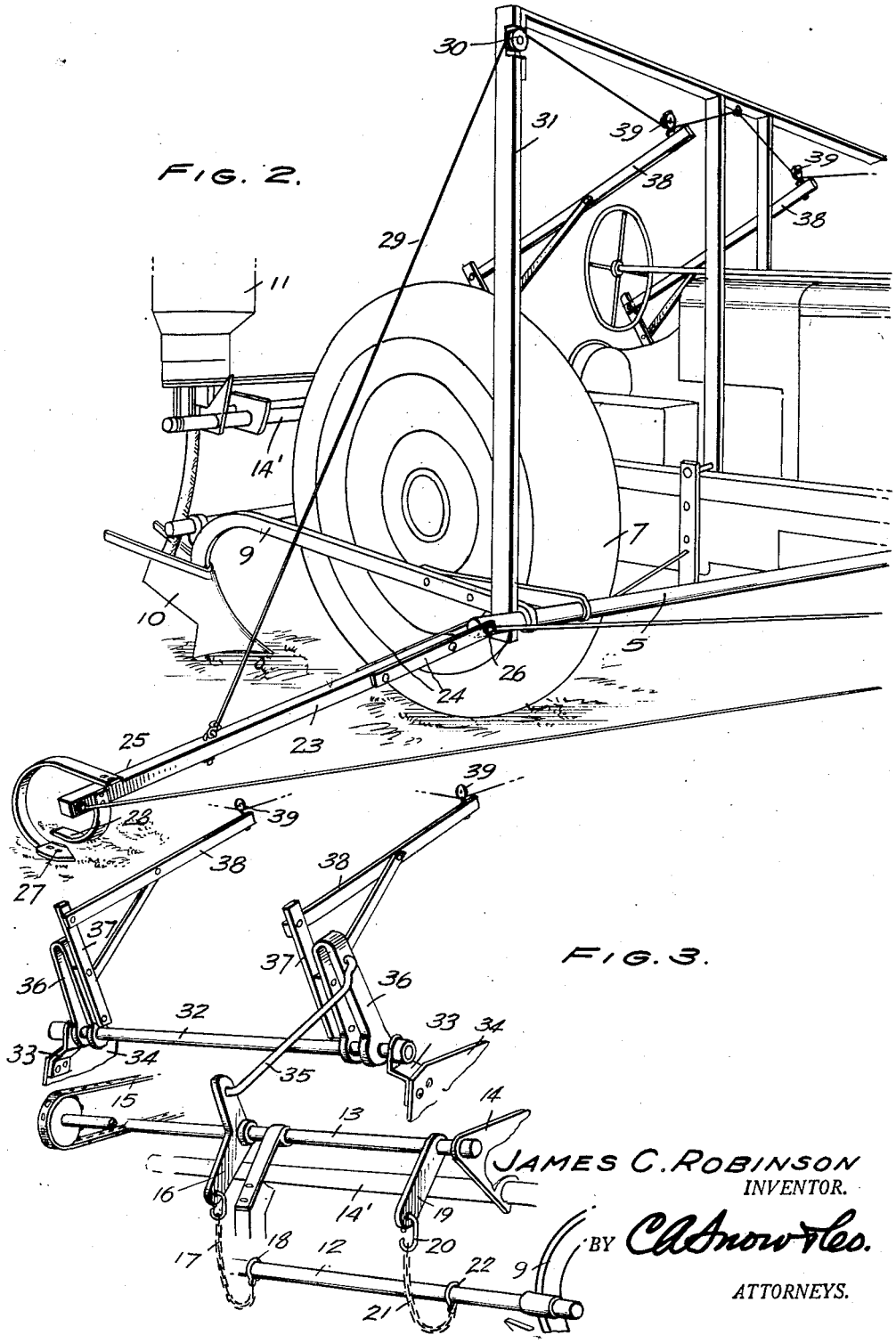

2,178,124

UNITED STATES PATENT OFFICE 2,178,124

TRACTOR POWER LIFT ROW MARKER

James C. Robinson, Paducah, Tex.

Application July 9, 1937, Serial No. 152,831

1 Claim. (Cl. 97—230)

This invention relates to a power operated marker designed for attachment to farm tractors, the primary object of the invention being to provide a device of this character which will mark the field during the planting operation, and one which will be automatically controlled when the plows of the planter are moved into and out of operation.

An important object of the invention is to provide a marker of the power operated type which will accomplish its purpose without the necessity of the operator giving special attention to the marker mechanism.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a perspective view of a tractor operated planter, equipped with a power marker, constructed in accordance with the invention.

Figure 2 is an enlarged perspective view illustrating a marker at one side of the planter, as moved to its active position.

Figure 3 is a diagrammatic view illustrating the marker operating mechanism as connected with the usual plow operating shaft of the planter.

Referring to the drawings in detail, the reference character 5 designates one of the main bars of the frame of the tractor operated planter, and the reference character 6 designates the tractor, which is supported by the rear wheels 7 and front wheels 8.

The bar 5, provides a support for the plow beams 9, which are pivotally mounted thereon, as shown by the drawings.

The plows, which are indicated by the reference character 10, and which operate at a point in advance of the delivery spouts of the feed hoppers 11, have connection with the operating bar 12, which forms a part of the usual planter construction. Pivotally mounted directly above the bar 12, is a shaft 13 that has its ends mounted in bearings formed in the plates 14 that are supported by the frame 14' of the planter.

The shaft 13 is power operated, and receives its motion through the chain 15 that in turn is operated by a suitable socket not shown, and which forms a part of the usual power operated planter. Secured to the shaft 13, is a bell crank lever 16 to which one end of the chain 17 is connected, the opposite end of the chain being provided with a ring 18 that encircles the bar 12. An arm indicated by the reference character 19 is also secured to the shaft 13, and has an opening through which the link 20 extends, the link having connection with the chain 21, that in turn is provided with a ring member 22 that is positioned over the bar 12, as clearly shown by Figure 3 of the drawings.

Thus it will be seen that due to this construction, the shaft 13 will operate to swing the bell crank lever 16 and arm 19 vertically, with the result that the chains 17 and 21 will act to lift or lower the shaft 12, thereby controlling the operation of the plows 10, to their active or inactive positions.

The markers, which are indicated by the reference character 23 are secured to opposite sides of the frame of the machine, each marker including a pair of plates 24 that are secured to the opposite sides of the arm 25, the plates 24 having pivotal connection with the bar 5 of the frame of the machine, at 26.

At the outer ends of the arms 25 of the markers, are curved marker plows 27, and spring guide arms 28 the latter arms being secured to the forward surfaces of the arms 25, the arms 28 being designed to ride over the ground surface and limit the depth of operation of the curved marker plows 27.

These pivoted markers, are operated by means of the cables or flexible members 29, which operate over the pulleys 30, mounted at the upper ends of the frame 31, which is secured to the frame of the machine in any suitable and well known manner.

As shown, this frame 31 extends upwardly, to a point an appreciable distance above the machine.

The marker operating mechanism also includes a shaft 32 mounted in bearings 33 that are secured to the frame at 34. Secured to the shaft 32, are arms 36 to which rods 35 are connected, the rods 35 being also connected with the bell crank levers 16, as shown by Figure 3. While I have shown and described only one of these bell crank levers 16 and one of the arms 19, it is to be understood that there is an arm 19 at the opposite end of the shaft 13, and a bell crank lever 16 connected with the arm 36 at the opposite end of the shaft 32, by a rod 35, not shown.

Connected with the arms 36, are arms 37 to which the arms 38 are connected, the arms 38 being disposed at right angles with respect to the arms 37. Pulleys indicated by the reference character 39 are secured to the free ends of the arms 38 and are positioned so that the cables or flexible members 29, extend therethrough.

Thus it will be seen that when the operator of the machine operates the mechanism to cause the shaft 13 to rotate, the plows 10 will be elevated, and the free ends of the arms 38 will be moved downwardly, causing the cables 29 to pull upwardly on the arms 25, raising the markers from their contact with the ground surface.

It will also be seen that this operation takes place simultaneously with the movement of the plows to their inactive positions. It will of course be understood that as the plows 10 are returned to their active positions, the markers will also be returned to contact with the ground surface and accomplish the purpose of the invention.

Having thus described the invention, what is claimed is:

In a motor driven planter, a frame, pivoted plow beams mounted on the frame, markers pivotally mounted on the frame, a power shaft mounted on the frame, a bar connecting the plow beams, a shaft adapted to be rocked supported above the power shaft, an operating arm secured to the rockable shaft, a bell crank lever mounted on the power shaft, a chain connecting the bell crank lever and the bar, a rod connecting the bell crank lever and operating arm whereby movement of the power shaft rocks the rockable shaft, and means including flexible members associated with the rockable shaft and the markers for moving the markers through movement of the rockable shaft.

JAMES C. ROBINSON.